United States Patent [19]
Ichikawa et al.

[11] Patent Number: 5,279,874
[45] Date of Patent: Jan. 18, 1994

[54] ETHYLENE-PROPYLENE RUBBER COMPOSITIONS

[75] Inventors: Masayoshi Ichikawa; Kiyomitsu Terashima, both of Inazawa, Japan

[73] Assignee: Toyoda Gosei Co., Ltd., Nishikasugai, Japan

[21] Appl. No.: 785,014

[22] Filed: Oct. 30, 1991

[30] Foreign Application Priority Data

Oct. 31, 1990 [JP] Japan .................. 2-296291
Oct. 31, 1990 [JP] Japan .................. 2-296294

[51] Int. Cl.$^5$ .................. B29D 22/00; B29D 23/00
[52] U.S. Cl. .................. 428/36.8; 428/36.91; 428/36.92
[58] Field of Search .................. 428/36.8, 36.91, 36.92

[56] References Cited

U.S. PATENT DOCUMENTS 4,551,392 11/1985 Draexler .................. 428/495

FOREIGN PATENT DOCUMENTS 59-22943 2/1984 Japan .
63-241051 10/1988 Japan .

*Primary Examiner*—John Kight, III
*Assistant Examiner*—Duc Truong
*Attorney, Agent, or Firm*—Cushman, Darby & Cushman

[57] ABSTRACT

An ethylene-propylene rubber composition vulcanizable with sulfur in which the rubber component totally or mainly composed of EPDM is incorporated with a zinc oxide, a carbon black, and other ingredients. The EPDM has an iodine value of 20 to 35 and an active zinc oxide is incorporated therein as the zinc oxide in an amount of 1 to 10 PHR. Even with a sulfur vulcanization system, this ethylene-propylene rubber composition is permitted to have compression set resistance equivalent to that of conventional SBR and is improved in heat resistance as well.

9 Claims, 1 Drawing Sheet

ETHYLENE-PROPYLENE RUBBER COMPOSITIONS

BACKGROUND OF THE INVENTION

The present invention relates to an ethylene-propylene rubber composition obtained by vulcanization with sulfur, in which the rubber component totally or mainly composed of an ethylene-α-olefin-diene copolymer (hereinafter "EPDM" for short) is incorporated with a zinc oxide, a carbon black and other ingredients. In particular, this invention is concerned with an ethylene-propylene rubber composition best suited for high-pressure reinforcing hoses (ex. a brake hose as shown in FIG. 1), gaskets, and so forth. The vulcanized rubber layers of the hoses are required to have improved compression set resistance because the hoses have squeezed hose-joints. The gaskets are required to maintain good sealing properties over a prolonged period.

This invention will be explained specifically, but not exclusively, with reference to a brake hose.

In the present disclosure, unless otherwise stated, the unit "parts" is given by weight, and the unit "PHR" is a quantity with respect to 100 parts of rubber polymer.

The inner rubber layers of brake hoses have been generally made of styrene-butadiene rubber (hereinafter "SBR" for short). But today the replacement of SBR by EPDM is being under investigation so as to satisfy demands of improving heat-resistance and other properties of the hoses.

However, applying general EPDM compositions to the inner layer of a brake hose causes a problem that maintaining good sealing properties between an inner rubber layer 1 of a brake hose and a nipple 11a of a hose joint 11 under such severe conditions as stated above is difficult, especially preventing compression set of the rubber layer is difficult.

We have already reached an invention involving a inner layer made of a specific type of EPDM rubber vulcanized with peroxides in order to solve the above problem and filed the invention as a Japanese patent application (see Japanese published unexamined patent application sho 63(1988)-241051).

However, the peroxides used for vulcanization (of which safety care should be taken) are not only intractable but must be handled in an inert gas atmosphere as well, resulting in considerable productivity drops.

This problem may be solved by using sulfur vulcanization, but those skilled in the art are asserting that even with this it is impossible to impart sufficient compression-set resistance to EPDM rubber.

SUMMARY OF THE INVENTION

An object of this invention is to provide an EPDM composition which has compression set resistance equivalent to that achieved with conventional SBR and is improved in heat resistance (inclusive of thermal aging resistance), even when sulfur-vulcanization is carried out.

As a result of intensive efforts to achieve the object, we have now found that a certain level of compression set resistance can be obtained by using an active zinc oxide as an alternative to a zinc oxide incorporated into a vulcanizing composition, and have thus accomplished the present invention.

More particularly, this invention provides an EPDM composition in which the rubber component totally or mainly composed of EPDM is incorporated with a zinc oxide, a carbon black, and a sulfur in addition to other ordinary ingredients, comprising:

(i) the EPDM has an iodine value of 20 to 35, and the zinc oxide is an active zinc oxide that is incorporated therein in an amount of 1 to 10 PHR.

Thus, the EPDM composition of this invention permits a sulfur-vulcanized rubber to have compression set resistance equivalent to that of conventional SBR and to be improved in heat resistance (inclusive of thermal aging resistance) as well.

Therefore, this invention can make it easy to handle the vulcanizing agent, because the vulcanization system is based on sulfurs instead of peroxides, and can vulcanize the composition in atmosphere without using any inert gases. This then enables rubber extrudates, typically brake hoses, to be produced with high productivity. In addition, the sulfur vulcanization system can be more expected to improve the vulcanized rubber in the initial physical properties and oil resistance than the peroxide vulcanization system.

DETAILED DESCRIPTION OF THE INVENTION

Figure 1:
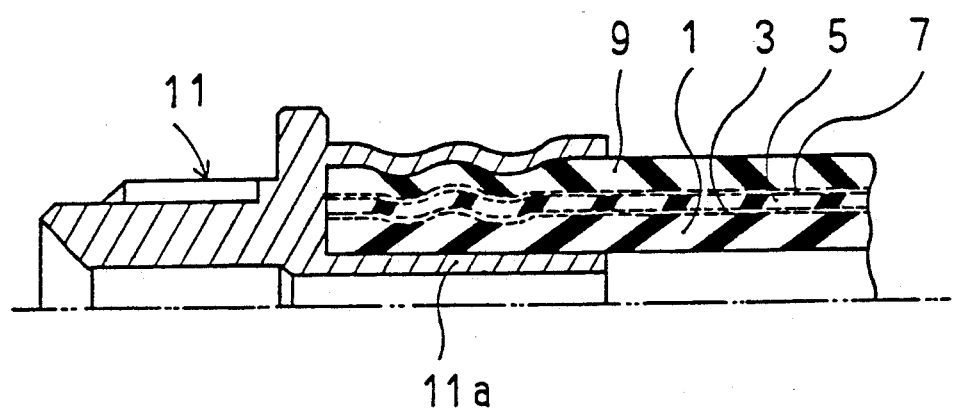
FIG. 1 is a partial sectional view of a brake hose that is produced using the EPDM composition of this invention.

The present invention will now be explained in detail.

EPDM may be produced by the polymerization of ethylene, an α-olefin and a non-conjugated diene at normal pressure or under some pressure in an inert solvent in the presence of a suitable catalyst. The polymerization conditions should then been adjusted such that the polymer has an iodine value in the range of 20 to 35.

The α-olefin is usually propylene, but may be 1-butane, etc. The non-conjugated diene used, for instance, may include ethylidene-norbornene, propenyl-norbornene, vinyl-norbornene, dicyclopentadiene, 1,4-hexadiene, 2-methyl-1, 5-hexadiene, 1,6-octadiene, 1,5-octadiene, 1,7-octadiene, 1,4-octadiene and methylhydroindene, which may be used alone or in combination of two or more.

At an iodine value below 20 difficulty would be encountered in obtaining the required strength and compression set resistance, while iodine values higher than 35 would give rise an increase in the points of crosslinking and hence an excessive increase in modulus, and involving difficulties to produce the polymers.

In order to achieve improvements in dragging resistance or other properties, the EPDM satisfying the following two conditions is preferably employed:

(i) the distribution of molecular weight must be narrow, as defined by $Mw/Mn < 5.0$, wherein Mw and Mn are the weight- and number-average molecular weights, respectively, and (ii) the compositional distribution of the α-olefin must be sharp or, in a more precise term, meets the following condition:

$$C_3E - C_3I < 5.0 \text{ wt \%},$$

wherein $C_3I$ and $C_3E$ means that the α-olefin content lies on the high- and low-molecular weight sides of the molecular weight distribution of a 20 wt % polymer, respectively.

It is noted that general versions of EPDMs usually have a molecular weight distribution Mw/Mn=8 to 20 and an α-olefin distribution $C_3E-C_3I=8$ to 15%.

Furthermore, EPDM may usually contain 60-70% of ethylene, 30-40% of the α-olefin and the diene (the 3rd component) in an amount of at most 5% per a total of 100% of the ethylene and α-olefin and have a Mooney viscosity—$ML_{1+4}$—of 35-55 as measured at 100° C.

The rubber component may consist of EPDM alone, but it is preferred that it comprises a mixture of EPDM with trans-polyoctenylene rubber (hereinafter "TOR" for short), because it would be expected to cause to an improvement in extrusion moldability.

TOR refers chiefly to a metathesis polymer of cyclooctene having a trans-double bond, and is mixed in an amount of 5 to 25 parts, preferably 10 to 20 parts with 100 parts of the EPDM polymer. At less than 5 parts and more than 15 parts, the product is likely to suffer surface roughening and the extrusion rate is lower than would be possible with SBR; in either case, any improvement in extrusion moldability would not be expected.

The rubber component totally or mainly composed of the EPDM is incorporated with the ingredients, which are usually employed in EPDM sulfur-vulcanizing system, such as a carbon black, a zinc oxide, processing aids, anti-aging agents and other ingredients.

As the zinc oxide for this invention, an active zinc oxide should be used in an amount of 1 to 10 PHR, preferably 3 to 7 PHR.

The term "active zinc oxide" means a type of zinc oxide that has a particle size of about 0.1 μm, smaller than that—0.3 to 0.7 μm—of general-purpose zinc oxide and possess intensive activity.

The active zinc oxide would make the vulcanization less than satisfactory at less than 1 PHR and would have an adverse influence on the strength of vulcanized rubber at more than 19 PHR.

Preferably, the carbon black used should be a so-called high oil-absorption type of the furnace black having an iodine adsorption of 40 to 80 mg/g and a dibutyl phthalate adsorption of 140 ml/g or more, as set forth in Japanese published unexamined patent application sho 59(1984)-22934, because some improvements in wear resistance, dragging resistance and resistance to yielding are expected. Preferably, this furnace black should be used in an amount of 40 to 60 PHR.

The preferred processing aids include a higher fatty acid such as stearic acid, while the preferred anti-aging agents include poly (2,2,4-trimethyl-1,2-dihydroquinoline).

A rubber composition prepared according to the above mentioned matters is extruded through an ordinary extruder and then vulcanized into a rubber hose. When obtaining gaskets, etc., they may be vulcanized by compression, transfer, injection, etc.

One illustrative example of this type of rubber hose is illustrated in FIG. 1.

A brake hose shown in FIG. 1, which is one example of rubber hoses. is built up of five layers, i.e., an inner rubber layer 1, a first fiber-reinforced layer 3, intermediate rubber layer 5, a second fiber-reinforced layer 7, and an outer rubber layer 9.

More specifically, the inner layer 1 is formed of the specific vulcanized EPDM composition according to this invention; the 1st and 2nd fiber-reinforced layers 3 and 7 each of a polyvinyl alcohol fiber treated with resorcinolformalin latex (RFL); the intermediate layer 5 of vulcanized natural rubber (NR) or butyl rubber (IIR); and the outer rubber layer 9 of vulcanized EPDM for general purposes. The intermediate layer 9, having a small thickness of 0.1 to 0.3 mm, is provided primarily for preventing the fiber-reinforced layers 3 and 7 from interfering with each other.

Even with the sulfur vulcanization system, it is possible to achieve compression set resistance comparable to that of conventional SBR and obtain improved heat resistance (inclusive of thermal aging resistance).

Thus, this invention makes it easy to handle the vulcanizing agent, because the system used for vulcanizing is based on sulfur rather than on peroxides, and can dispense with using any inert gas atmosphere for vulcanization. This then enables rubber extrudates, typically brake hoses to be produced with high productivity. In addition, the sulfur vulcanization system would make greater contributions to improvements in the initial physical properties and oil resistance of vulcanized rubber than would the peroxide vulcanization system.

EXAMPLES

The present invention will now be explained more illustratively, but not exclusively, with reference to the following examples.

In the example and comparative example to be given below, the EPDM used has the following polymer characteristics. As the α-olefin and diene components propylene and ethylidene-norbornene were respectively used. Mw/Mn was found from the molecular weight distributions measured by gel permeation chromatography (using an o-dichlorobenzene solvent), while $C_3E-C_3I$ was determined from the molecular weight distributions measured by fractional precipitation (with ten or more fractions; using a mixed cyclohexane/isopropyl alcohol solvent).

| Polymer Characteristics | |
|---|---|
| Ethylene content: | 64% |
| Iodine valve: | 29 |
| Viscosity $ML_{1+4}$ (at 100° C.): | 47 |
| Mw/Mn: | 3.1 |
| $C_3E-C_3I$: | 3 |

The following EPDM formulations were used for the example and the comparative example, while the following SBR one was used for the reference example. In the example according to this invention the active zinc oxide was used, whereas in the comparative example ordinary non-active zinc oxide was employed.

| EPDM FORMULATION | |
|---|---|
| EPDM | 90 parts |
| TOR* | 15 |
| Furnace Black (HS) | 55 parts |
| Active or non-active zinc oxide | 5 parts |
| Processing aid (higher fatty acid) | 3 parts |
| Anti-aging agent | 1.5 parts |
| Powdery sulfur | 0.6 parts |
| Vulcanization accelerator | 4.75 parts |

*Vestenamer 8012 (trade name: made by Huelus Co., Ltd.)

| SBR FORMULATION | |
|---|---|
| SBR | 100 parts |
| Furnace black | 60 parts |
| Non-active zinc oxide | 5 parts |

| SBR FORMULATION | |
|---|---|
| Stearic acid | 1 parts |
| Anti-aging aid | 4 parts |
| Sulfur | 0.5 parts |
| Vulcanization accelerator | 3 parts |

It is noted that the furnace black used in the example and comparative example was of the following high oil-absorption type and that in the reference example was of the following normal type, respectively.

| | High Oil Absorption | Normal |
|---|---|---|
| Iodine adsorption in mg/g | 58 | 53 |
| Dibutyl phthalate absorption in ml/100 g | 190 | 133 |

A batch of each of the above-mentioned rubber formulations was kneaded together to prepare the rubber materials, from each of them the test pieces were prepared for the compression set test according to JIS K 6301 (at 120° C. for 22 hours).

The findings of the compression set tests were 36% in the example according to this invention, 50% in the comparative example and 35% in the reference example respectively; from them it is understood that the vulcanized EPDM material containing the active zinc oxide is much improved in compression set resistance over that containing the non-active zinc oxide, comparable to that of the vulcanized SBR material.

What is claimed is:

1. An ethylene-propylene rubber composition vulcanizable with sulfur, in which the rubber component totally or mainly composed of EPDM is incorporated with a zinc oxide, a carbon black, and other ingredients,
   (a) said EPDM having an iodine valve of 20 to 35, and
   (b) said zinc oxide being an active zinc oxide contained in an amount of 1 to 10 PHR.

2. The ethylene-propylene rubber composition of claim 1, wherein said EPDM satisfies the following conditions:
   a molecular weight distribution $Mn/Mn < 5.0$, wherein Mw is the weight-average molecular weight and Mn is the number-average molecular weight, and
   an α-olefin composition distribution $C_3E - C_3I < 0.5$ wt %, wherein $C_3I$ and $C_3E$ means that the α-olefin content lies on the high- and low- molecular weight sides of the molecular weight distribution of a 20 wt % polymer, respectively.

3. The ethylene-propylene rubber composition of claim 1, wherein said rubber component is a blend comprising 100 parts by weight of EPDM and 5 to 20 parts by weight of trans-polyoctenylene rubber.

4. The ethylene-propylene rubber composition of claim 1, wherein said carbon black is a furnace carbon black having an iodine adsorption of 40 to 80 mg/g and a dibutyl phthalate oil absorption of 140 ml/g or more.

5. A rubber hose with at least one layer built up of a vulcanized rubber material, wherein:
   said vulcanized rubber material is made of an ethylene-propylene rubber composition vulcanized with sulfur, in which the rubber component totally or mainly composed of EPDM being incorporated with a zinc oxide, a carbon black, and other ingredients,
   (a) said EPDM having an iodine valve of 20 to 35, and
   (b) said zinc oxide being active zinc oxide contained in an amount of 1 to 10 PHR.

6. The rubber hose of claim 5, wherein said EPDM satisfies the following conditions:
   a molecular weight distribution $Mw/Mn < 5.0$ Wherein Mw is the weight-average molecular weight and Mn is the number-average molecular weight, and
   an α-olefin composition distribution $C_3E - C_3I < 5.0$ wt % wherein $C_3I$ and $C_3E$ means that the α-olefin content lies on the high- and low- molecular weight sides of the molecular weight distribution of a 20 wt % polymer, respectively.

7. The rubber hose of claim 5, wherein said rubber component is a blend comprising 100 parts by weight of EPDM and 5 to 20 parts by weight of trans- polyoctenylene rubber.

8. The rubber hose of claim 5, wherein said carbon black is a furnace carbon black having an iodine adsorption of 40 to 80 mg/g and a dibutyl phthalate oil absorption of 140 mg/g or more.

9. A rubber hose with at least one layer built up of a vulcanized rubber material, wherein:
   said vulcanized rubber material is made of an ethylene-propylene rubber composition vulcanized with sulfur, in which the rubber component totally or mainly is composed of EPDM being incorporated with a zinc oxide, a carbon black, and other ingredients,
   (a) said EPDM having an iodine valve of 20 to 35, and
   (b) said zinc oxide being active zinc oxide having a particle size of about 0.1 μm contained in an amount of 1 to 10 PHR.

* * * * *